UNITED STATES PATENT OFFICE.

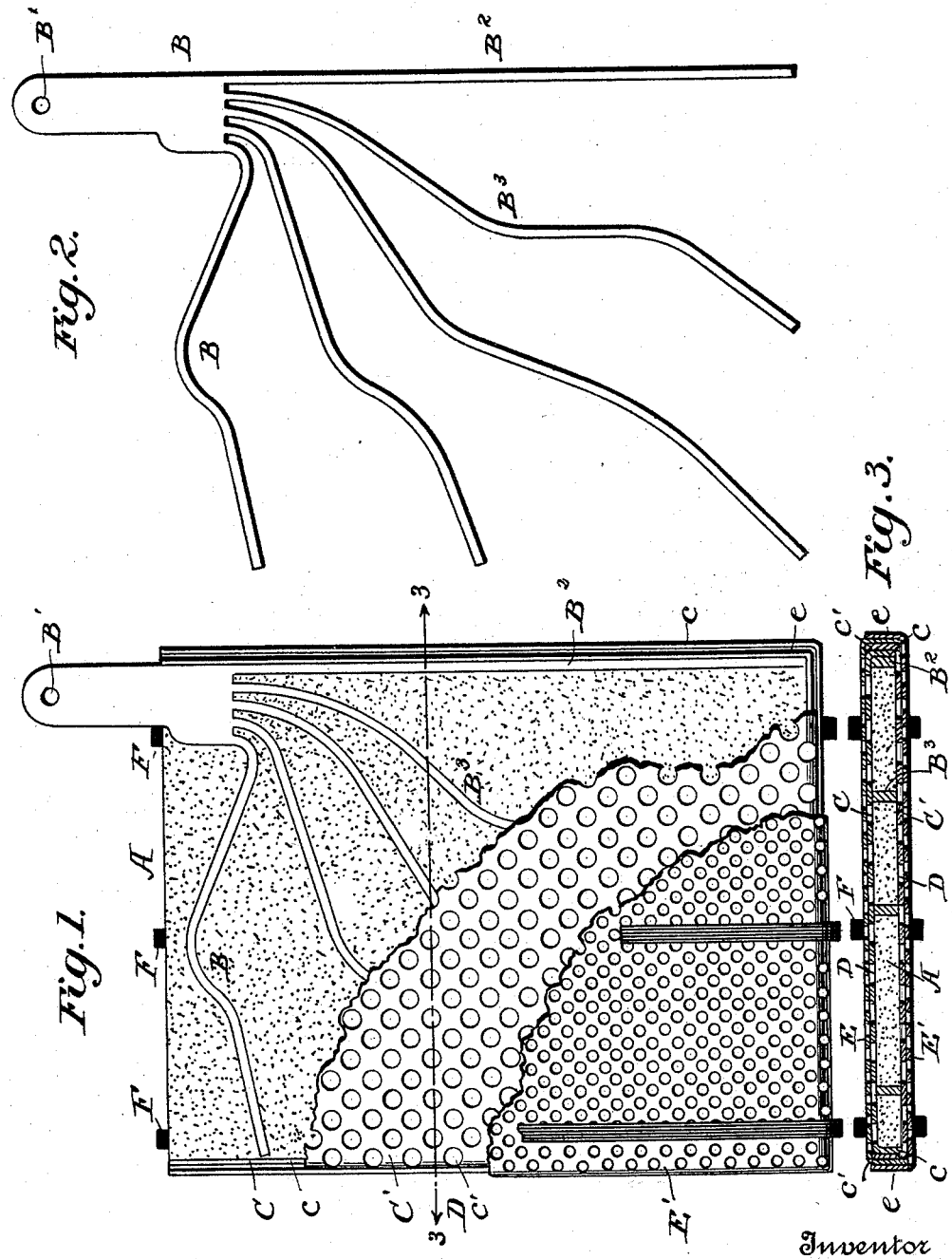

IZAK SAMUELS, OF NEW YORK, N. Y., ASSIGNOR TO CHARLES H. BURNETT, ASSIGNEE OF THE SAMUELS DYNAMIC ACCUMULATOR COMPANY.

SECONDARY BATTERY.

SPECIFICATION forming part of Letters Patent No. 585,853, dated July 6, 1897.

Application filed August 11, 1896. Serial No. 602,428. (No model.)

*To all whom it may concern:*

Be it known that I, IZAK SAMUELS, a citizen of the United States, residing at New York, in the county and State of New York, have invented certain new and useful Improvements in Secondary Batteries, of which the following is a specification.

My invention relates to secondary batteries, and has for its object to improve and simplify the construction of such batteries for the purpose of increasing their life and efficiency; and to these ends my invention consists in the various features substantially as hereinafter more particularly pointed out.

Referring to the accompanying drawings, Figure 1 is a side view, partly in section, of a secondary-battery electrode embodying my invention. Fig. 2 is a side view of the preferred form of terminal or conductor, and Fig. 3 is a transverse sectional view of Fig. 1 on the line 3 3.

In the drawings I have shown a single element, which may be the positive element of the battery, and the negative element may be substantially the same, and these elements are independent of each other and can be separately placed in and removed from the battery case or cell and any desired number of them may be arranged together to form a battery of any desired capacity.

In making a secondary-battery element the more usual form is to provide some sort of a grid or support and to apply the active material or material to become active to said support, and it has been applied in many and various ways; but in my battery the plate is made solely of a compound of active material or material to become active, said plate in its entire mass being made of a plastic material which becomes hard and self-sustaining, thus doing away with the usual grid or support. I apply to this plate means to aid in conducting the current through the mass and to reduce the resistance of the cell, as well as means to prevent short-circuiting of the plate or other objectionable features due to the expansion of the plate or any disintegration of it which may take place during operation, and with this general description of the invention I will now proceed to describe the embodiment illustrated in the drawings.

The plate A, of active material or material to become active, may be of any proper composition—such, for instance, as some of the oxids of lead or other suitable material—and is made in a plastic mass and is molded into the desired shape, and before it has finally set or hardened I embed in the plate a terminal or conductor B. This terminal may be of any good conducting material, but is preferably of a non-corrodible material—such, for instance, as a composition of lead and antimony. It is made large at its upper end, so as to withstand wear and furnish good conductivity, and is provided with a hole B', by which the elements may be connected together, and its lower portion is divided into a number of projecting arms or branches $B^2 B^3$, &c., which are flexible, so as to permit of their bending and moving with the expansion of the mass of the plate. This terminal or conductor is embedded in the plastic mass of the plate, so that its sides are practically in a plane with the sides of the plate.

In order to further aid in reducing the resistance to the plate, I provide a case consisting, essentially, of two portions or coverings C C', each having flanges $c\ c'$ at its sides and one end, which flanges are bent practically at right angles, so that the two portions or coverings of the case will fit telescopically within each other. These coverings are preferably made of some material which is non-corrodible—as, for instance, lead and antimony—the same as the conductor, and they are soldered or otherwise secured to the conductor, and especially at its upper portion, so as to form practically a part of the conductor, reducing the electrical resistance. These coverings are perforated, as at D, having a large number of perforations, so that practically a half of the material of the coverings has been extirpated in order to expose large portions of the plate to the electrolytic fluid. These coverings are thus put around the plate of active material, and being more or less flexible and connected to the conductor they conform to the plate under expansion and still maintain good electric contact with a large portion of the surface of the plate, while at the same time exposing a large portion of the surface to the electrolytic fluid. I find that these non-corrodible, flexible, and perforated coverings connected to the conductor in the manner described afford a most satisfactory construction and accomplish the results desired in the way of aiding the production of an efficient battery capable of withstanding hard use in actual work. It will be observed that I do away with the ordinary supporting-grid, and thereby get more active material in less space for a given weight, and by placing the flexible coverings around the material maintain the conductivity under expansion and get good contact under all conditions, giving the greatest exposure of the active material to the electrolyte, and at the same time prevent serious disintegration. The plates thus made are then inclosed in insulating perforated plates E E', having flanges $e$, and these plates are arranged telescopically with each other, so as to provide for expansion, especially of the positive element, and at the same time they protect the plates from disintegration and do not in any way interfere with the conductivity of the electric current. These insulating-plates are held in position by rubber bands F, extending around the plate, and these bands serve to maintain the different elements in proper relations with each other in the cell and to aid in insulating the elements, the bands on the adjacent plates preferably being arranged at different points, so that they will intermesh in a manner well understood.

A plate thus constructed I have found from experience presents advantages over any other plate with which I am acquainted in many respects in that it can be cheaply and quickly made and when made it possesses the well-known requirements or advantages of a secondary-battery plate in the highest degree in that it offers an exceedingly low resistance to the electric current. It affords the greatest amount of active material or material to become active with relation to its weight. It provides for expansion, preventing the so-called "buckling" of plates, and also provides for any possible disintegration of the plate, which is liable to short-circuit or otherwise interfere with the operations of the battery.

What I claim is—

1. A secondary-battery element, comprising a plate of active material, a terminal embedded therein, and a case of conducting material inclosing the plate, the case consisting essentially of two portions each being perforated and having flanges at its sides and one end, and the two portions moving telescopically within each other inclosing the conducting-case except at one end and permitting of expansion and contraction of the plate, substantially as described.

2. A secondary-battery element, comprising a plate of active material, a terminal embedded therein, a telescopic case of conducting material inclosing the plate, and a telescopic case of non-conducting material inclosing the conducting-case, substantially as described.

3. A secondary-battery element, comprising a plate of active material, a conducting-terminal embedded therein, and a telescopic case of conducting material inclosing the terminal, the said case being connected to or forming a part of the terminal, substantially as described.

4. A secondary-battery element, comprising a plate of active material, a conducting-terminal embedded therein, and a conductive perforated telescopic case embracing the plate and connected to or forming a part of the conducting-terminal, the conductive case being of flexible non-corrodible material, substantially as described.

5. A secondary-battery element, comprising a plate of active material, a conducting-terminal embedded therein, a conductive telescopic case of perforated flexible non-corrodible material inclosing the plate, and perforated telescopic non-conducting plates embracing the conductive case, substantially as described.

In testimony whereof I have signed my name to this specification in the presence of two subscribing witnesses.

IZAK SAMUELS.

Witnesses:
MARK J. SAMUELS,
OSCAR JOHNSON.